United States Patent
Holtz

[11] 3,914,669
[45] Oct. 21, 1975

[54] SYSTEM FOR ATTENUATING VERTICAL OSCILLATIONS OF A SUSPENDED TRACK BOUND PROPULSION VEHICLE

[75] Inventor: Joachim Holtz, Erlangen, Germany

[73] Assignee: Siemens Aktiengesellschaft, Munich, Germany

[22] Filed: Oct. 31, 1974

[21] Appl. No.: 519,681

[30] Foreign Application Priority Data
Nov. 13, 1973 Germany............................ 2356679
Feb. 13, 1974 Germany............................ 2406820

[52] U.S. Cl........................... 318/135; 104/148 LM
[51] Int. Cl.² ................................... H02K 41/02
[58] Field of Search ..... 318/135, 687; 104/148 LM, 104/148 MS

[56] References Cited
UNITED STATES PATENTS
3,638,093  1/1972  Ross............................ 104/148 MS
3,736,880  6/1973  Ross............................ 318/135 X Primary Examiner—R. N. Envall, Jr.
Attorney, Agent, or Firm—Kenyon & Kenyon Reilly Carr & Chapin

[57] ABSTRACT

In a suspended track bound propulsion vehicle driven by a synchronous linear motor comprising an exciter winding and a traveling field winding vertical oscillations are attenuated by supplying to the synchronous linear motor with an AC voltage variable in amplitude and phase with variations obtained through an adjustable controlled static converter responsive to a control signal developed in a damping control having an input from measuring means which output a variable which is proportional to the vertical oscillations of the propulsion vehicle.

19 Claims, 7 Drawing Figures

SYSTEM FOR ATTENUATING VERTICAL OSCILLATIONS OF A SUSPENDED TRACK BOUND PROPULSION VEHICLE

BACKGROUND OF THE INVENTION

This invention relates to track bound propulsion vehicles which are suspended above a track and driven by synchronous linear motors in general and more particularly to a system for attenuating vertical oscillations in such vehicles.

Linear motors offer an excellent means of providing propulsion for track bound self-propelled vehicles used in local traffic cabin type transit systems, rapid transit railroads and for high performance rapid transit railroad operating at speeds up to 500 km/hr. Among the individual variants of this type of motor a synchronous linear motor whose stator is installed along the roadway as a traveling field winding and whose exciter is installed in the vehicle as a comovable translator demonstrates high efficiency and simple energy transmission. Such a synchronous linear motor is also referred to as a synchronous long stator motor because of the unusual length of the stator. In the following, the term "linear motor" always refers to such a long stator motor.

As is well known by those skilled in the art, a synchronous linear motor consists of two parts (see Arch. f. Elektrotechn, vol. 55, no. 1 (1972) pages 13 to 20.) Thus, either a DC carrying exciter winding, which may extend over the entire length of the vehicle, or a permanent magnet is installed on the self-propelled vehicle as the comoving exciter (translator). A traveling field winding (stator) is installed along the roadbed. The traveling field winding, which generally is a multi-phase winding, produces a traveling field which travels in the longitudinal direction of the roadbed and drives the vehicle, as a function of the voltage and frequency supplied thereto.

Experience has shown that when operating a track bound propulsion vehicle suspended above the roadbed, mechanical oscillations or hunting perpendicular to the track plane and which are most undesirable occur. The propulsion vehicle is maintained suspended over the track by a suspension device such as a electromagnetic or electrodynamic suspension system and represents an oscillating or elastic system. Such vertical oscillations of the vehicle can impair not only the riding comfort but can also lead to a condition where stable operation of the suspension device becomes impossible. In order to attenuate such oscillations one would normally think of operating on the suspension system. However such requires much effort and is quite costly. To do so requires damping devices or correction devices having associated controls which thereby increase the weight of the vehicle and also require additional servicing.

In view of these problems the need for a system or circuit arrangement for damping vertical oscillations of such a propulsion vehicle which is of simple and low cost design becomes evident.

SUMMARY OF THE INVENTION

The present invention provides such a device. It is based on the discovery that the synchronous linear motor which was originally designed only to drive the propulsion vehicle can also be utilized as a control element for damping vertical oscillations. In accordance with the present invention such damping is accomplished by supply the traveling field winding of the synchronous linear motor with an AC voltage having a variable amplitude and phase, both being adjusted through a controlled static converter which is responsive to a control signal developed in an attenuation control device having an input from measuring means having an output variable which is a function of the vertical oscillations of the propulsion device.

Thus, in accordance with the present invention, it is not the suspension device which keeps the propulsion vehicle suspended above the track which is used for controlling and damping vertical oscillations but is instead the travel field winding which furnishes the propulsion energy to the vehicle which serves this purpose. As a result a separate control element for the suspension device is not required. Furthermore the required circuit arrangement can be constructed at a low cost as ancillary equipment to the control and regulating system for the synchronous linear motor which is required in any case.

The measuring means for providing an output variable proportional to oscillations may be a type of device which provides a constant output in addition to a variable output. In such a case the variable portion which is time dependent and which is the only portion of the signal of interest can be filtered out a blocking capacitor as a high pass filter. Alternatively a band pass filter tuned to the frequency range of the vertical oscillations with the input of the filter coupled to the measuring means and its output to the attenuation control device can be used. It is possible to use either a passive or an active band pass filter. A typical passive band pass filter will comprise a capacitor and two resistors in series with a shunt capacitor coupled to the junction of the two resistors. For an active filter an operational amplifier having high open circuit gain and having a capacitor and resistor in series at its input and a resistor and capacitor in parallel in its feed back circuit may be used.

Various types of measuring means may be used to supply an output variable which is a function of the vertical oscillations of the propulsion vehicle. The measuring means may provide an output based on measuring a mechanical quantity or may be a type measuring the electric power oscillations in the traveling field winding. Typical of the first type of measuring means are accelerating measuring means designed to measure the vertical oscillatory acceleration and which will be mounted in a stationary manner on the vehicle. Furthermore a distance measuring means for measuring the vertical distance between the propulsion vehicle and the track and disposed on the motor vehicle may also be used. With this type of device because the information furnished by the measuring member, which moves with the vehicles, is required at a converter location mounted on the roadbed, it must be transmitted by radio.

The second type of measuring means i.e., electric power measuring means can comprise means for measuring electric power at the input to the traveling field winding. Such is possible because the mechanical vertical oscillation leads to variable braking losses. These braking losses in turn lead to variations in the active power. As a result the oscillations of the propulsion vehicle in a direction perpendicular to the roadbed can be measured indirectly at the point where energy is fed into the traveling field winding using such a power measuring means. By using this type of measurement a radio transmission becomes unnecessary. A typical power measuring means means may comprise a current transformer and a voltage transformer coupled to a multiplier.

In accordance with another feature of the present invention a control circuit for controlling the propulsion vehicle to an optimum operating point, with this control circuit having superimposed thereon the output signal of the damping control device is employed. With such an arrangement the control circuit for controlling attenuation is then an ancillary device for the control circuit which controls the propulsion system to bring it to the optimum operating point. The ancillary device causes the synchronous linear motor to temporarily operate at an operating point other than the optimum operating point if required for the attenuation of vertical oscillations.

In accordance with a further feature the control circuit used for controlling the optimum operating point comprises a current angle control circuit and a current magnitude control circuit. The output signal of the attenuation control device is superimposed on the current angle deviation in the current angle circuit in the sense of de-tuning the control from the optimum operating point. In order to assure adequate attenuation of the vertical oscillations even when the propulsion force is small it is advantageous if the output signal of the attenuation control device is also superimposed on the desired current value in the current magnitude control circuit in such a manner as to keep the current magnitude constant.

As is noted above, a power measuring means can be used as the measuring means for vertical oscillations. However when using such a power measuring means active power changes not attributable to vertical oscillations of the propulsion vehicle, such as gusts of wind hitting the vehicle or active power changes occurring due to travel up or downhill can be picked up. Active power output changes not related to vertical oscillations can also occur when curves are being negotiated. Clearly a device which does not require radio transmission and which delivers an output signal representing only vertical oscillations and independent of interference factors of this type is desirable. A measuring circuit of this type can be embodied in a computing circuit which computes the magnitude of the main field voltage as the quantity used as a quantity proportional to vertical oscillations. When such a measuring means is used the state of oscillation of the propulsion vehicle is derived at the location of the converter itself using the computed magnitude of the main field voltage induced in the traveling field winding by the propulsion vehicle. If the speed of the motor vehicle is known, this main field voltage is a function only of the suspension height.

In accordance with a preferred feature a control circuit for the control of the propulsion vehicle's propulsion at an optimum operating point is provided with a supplemental control signal provided by the attenuation control device and superimposed on the control deviation of this control circuit. In accordance with this feature one common computing circuit is provided for the formation of the actual value of the control circuit and for the computation of the magnitude of the main field voltage. In order to separate the DC component of the measuring signal supplied by the computing circuit, a high pass filter is preferably inserted between the output of the computing circuit and the attenuation control device.

DETAILED DESCRIPTION OF THE PREFERRED EMBODIMENT

Figure 1:
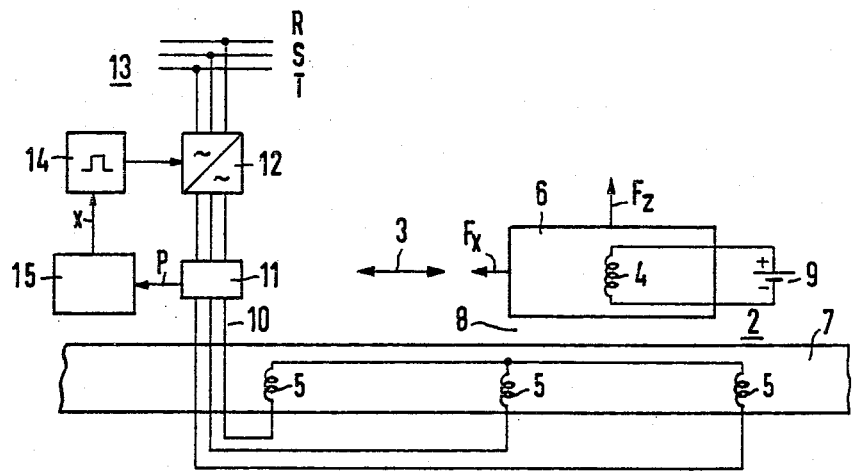
FIG. 1 is a schematic-block diagram of a synchronous linear motor in the form of a long stator motor having a control and regulating device for propulsion and in addition having the control system of the present invention for attenuating vertical oscillations.

FIG. 1 illustrates in block diagram form a magnetic suspension vehicle driven by a synchronous linear motor 2 in the direction of the double arrow 3. The magnetic suspension vehicle may be a high performance rapid transport vehicle for long distance travel. The linear motor 2 comprises essentially an exciter winding 4 and a three phase traveling field winding 5 designed to provide the propulsion power for the vehicle. The exciter winding 4 may be housed in a pole piece 6 of ferromagnetic material. In such a case the pole piece 6 is a component of the magnetic suspension vehicle, which is not shown in detail. However other embodiments without such a pole piece 6 are also possible. The vehicle is maintained suspended above the track 7 using an electrodynamic suspension device not shown in detail. As a result a gap 8 of essentially equal height over the length of the vehicle exists between the track 7 and the vehicle.

The exciter winding 4 can extend over the full length of the vehicle. In the illustrated embodiment it is supplied with direct current from a DC voltage source 9. However an AC or a variable DC supply can also be used. The exciter winding 4 is also referred to as a translator. Typically it may be wound of a superconducting material although it also possible to use permanent magnets or an exciter winding equipped with a conventional iron core instead.

The three phase traveling field winding 5 is mounted stationarily on the roadbed or track 7. It can cover long distances in the travel direction and must therefore be considered a long stator. The total travel distance of the magnetic suspension vehicle can be divided into a number of line sections each containing a three phase traveling field winding 5 which interacts with the exciter winding 4 moved over it in the manner of a synchronous linear motor. The force component exerted on the motor vehicle in the propulsion is shown on the Fig. as $F_x$.

At its input 10, the travelling field winding 5 is coupled through a measuring means 11 adapted to measure input power to the output of a stationary, controlled static converter 12. Converter 12 will preferably utilize semiconductor rectifiers such as thyristors and diodes and is suppled from a three phase AC network 13 having phase conductors R, S, and T. The supply network may be an ordinary AC voltage supply system with a frequency such as 50 or 60 Hz. A typical voltage for feeding the converter 12 will be 10 kV. A transformer may be installed between the network 13 and converter 12. Either a direct converter or a converter with an intermediate DC link may be used as converter 12. In addition any converter which is controllable by means of a control signal and supplies an AC voltage variable in amplitude and phase may be used.

A control unit 14 provides input to the converter 12. In response to a control signal designated $x$ at the input of control unit 14 power at the desired voltage frequency and phase will be fed into the traveling field winding 5 from the AC network 13 through the static converter 12. The control signal $x$ is generated by a control and regulating device 15 having as its input an output from the measuring means 11. In the gap 8 the traveling field winding 5 generates a traveling field traveling selectively in one of the two directions of the double arrow 3 carrying the magnetic suspension vehicle along with it.

In order to avoid oscillations in a direction normal to the magnetic suspension vehicle and to the track plane i.e., normal to the double arrow 3 a system for the attenuation of these vertical oscillations is provided within the control and regulating device 15. This system essentially comprises a circuit including a control circuit with the measuring means 11 and converter 12 as portions thereof. In this connection it must be noted that the steps taken to damp oscillations are not taken in the suspension device which is not shown on the Figure but rather in the propulsion device for the magnetic suspension vehicle. These measures are based on the discovery that force components $F_x$ and $F_z$ occur in a synchronous linear motor. As illustrated on the Figure the force $F_x$ is in the propulsion direction and the force $F_z$ normal thereto. Furthermore it was discovered that these forces can be separately controlled. Since the steps for attenuating oscillations are carried out in the propulsion device which is required in any case, additional control elements in the suspension device are unnecessary.

Figure 2:
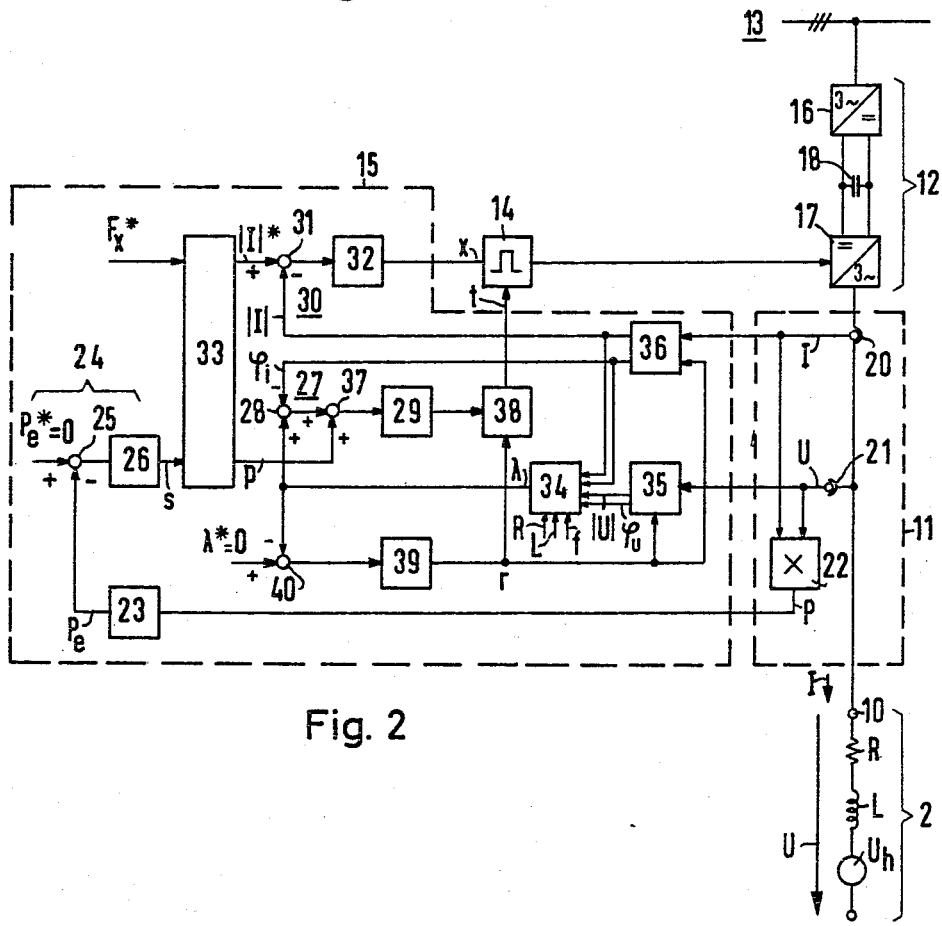
FIG. 2 is a schematic in more detail of the synchronous linear motor of FIG. 1 illustrating the control circuit of the present invention.

FIG. 2 is a schematic illustration of a synchronous linear motor 2 such as that of FIG. 1 having a control and regulating device 15 in accordance with the present invention. In the illustrated embodiment the converter 12 which is coupled to the AC network 13 comprises an uncontrolled three phase rectifier 16 and an inverter 17 responsive to the control unit 14. The rectifier 16 and inverter 17 are coupled to a smoothing capacitor 18 through an intermediate DC link having an impressed link voltage. The inverter 17 may be a pulsed inverter. It supplies its output to the input 10 of the synchronous linear motor. In contrast to FIG. 1 the synchronous linear motor 2 is shown in the form of its equivalent circuit including the effect of the exciter winding 4. This equivalent circuit comprises the series connection of a resistor having a resistance R and an inductive impedance with and inductance L along with a fictitious counter emf from the main field voltage $U_h$.

The synchronous linear motor may be one equipped with a superconducting magnet coil in the form of an ironless motor or with a permanent magnet as a permanently excited motor.

Figure 3:
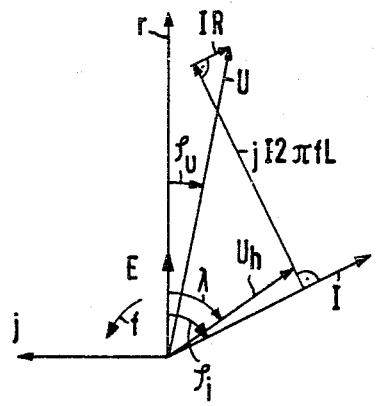
FIG. 3 is a vector diagram helpful in understanding the operation of FIGS. 1 and 2.

For a better understanding of the operation of the system of FIG. 2 reference should first be had to FIG. 3 which is a vector diagram of the various voltages and currents developed in the synchronous linear motor. This Figure illustrates the quasistationary operational behavior of the synchronous linear motor. The diagram includes a reference system formed by the vectors $r$ and $j$ which are at right angles to each other, with the vector $r$ representing the real axis and the vector $j$ the imaginary axis. E is the unit vector in the direction of real axis $r$. The vector diagram rotates at the frequency $f$ in the rotary sense shown. Illustrated is the voltage vector U and the stator current vector I present at the input 10 of FIGS. 1 and 2. The voltage vector U is made up the geometric sum of the main field voltage $U_h$ induced in the traveling field winding 5 by the vehicle and the voltage drops IR and $j2\pi fL$ through the resistance and inductance. The voltage vector U makes a voltage phase angle $\phi_u$ with the vector $r$ while the stator current vector I makes a current phase angle $\phi_i$. The main field voltage vector $U_h$ is at an angle $\lambda$ to the vector $r$.

It is assumed that the angular difference $(\lambda - \phi_u)$ i.e. the angle between the voltage vector U and the vector of the main field voltage $U_h$ induced in the travelling field winding 5 due to the motion of the translator is a measure of the pole position of the translator. [The vector $U_h$ represents the induced voltage which is in a sense fictitious and not directly measurable]. This analysis follows from analogy with a rotating synchronous motor. As a result a phase angle $\lambda$ is also a measure of the pole position of the translator. It follows from an examination of FIG. 3 that if U, I, $f$, R and L are known, the phase angle $\lambda$ and the magnitude of the main field voltage $U_h$ can be calculated without difficulty. The manner of carrying out such calculations is disclosed in detail in U.S. application Ser. No. 493,895 filed Aug. 1, 1974 and assigned to the same assignee as the present invention.

Figure 4:
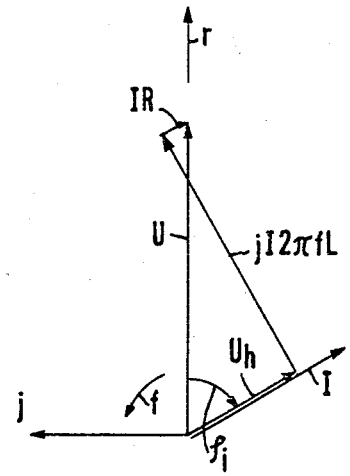
FIG. 4 is a similar vector diagram illustrating optimum operating point for the converter.

The efficiency of the synchronous linear motor 2 depends to a great extent on the level of the line losses $I^2R$ along the line where I is the stator current supplied and R the resistance of the traveling field winding 5. As a result operation with the lowest possible stator current I should be attempted so that the required propulsion force componed $F_x$ can be produced by a large number of magnet poles in the propulsion vehicle. If the stator current I is given, a maximum propulsion force component $F_x$ is produced when the ampere turns wave of the traveling field winding 5 is in phase with the induction wave of the exciter system. In other words such occurs when the stator current vector I in FIG. 3 and the main field voltage $U_h$ point in the same direction. This condition hereinafter will be referred as the optimum operating point. In such a case the angular relationship $\lambda = \phi_i$ must hold:

FIG. 4 illustrates the vector diagram for this operating point for stationary operation.

In summary it can be stated that in the long stator design of a synchronous linear motor the propulsion force component $F_x$ is formed by the interaction of the ampere turns wave brought about by the traveling field winding 5 and the exciter field brought about by the exciter disposed in the propulsion vehicle. The propulsion force componed $F_x$ has a maximum at the optimum operating point which is defined as that point on the vector diagram where the stator current vector I and main field voltage vector $U_h$ are in phase.

Figure 5:
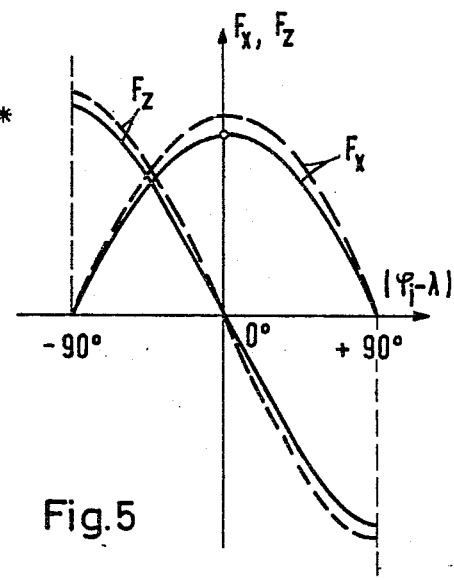
FIG. 5 is a diagram illustrating the components of the propulsion force and a force normal thereto developed in the synchronous linear motor as a function of phase angle.

On FIG. 5 the propulsion force component $F_x$ and the normal force component $F_z$ of a synchronous linear motor such as synchronous linear motor 2 are plotted as a function of phase angle $(\phi_i - \lambda)$. In both instances the broken lines differ from the solid lines in that the stator current I is higher. It becomes clear from FIG. 5 that at the optimum operating point $\phi_i = \lambda$ there is no force component $F_z$ in the direction z normal to the track plane. At this point the force component $F_x$ and the propulsion direction x is at its maximum. A normal force componet $F_z$ occurs only when the operating point moves away from the optimum operating point $\phi_i = \lambda$. When the operating point is near the optimum operating point $\phi_i = \lambda$, the propulsion force component $F_x$ deviates only slightly from its maximum value. However, the normal force component $F_z$ changes considerably with small deviations from the optimum operating point. And, the sign of the normal force component $F_z$ depends on the sign of the phase angle $(\phi_i - \lambda)$.

It is further evident from FIG. 5 that the normal force component $F_z$ increases with increasing deviation from the optimem operating point $\phi_i = \lambda$. If the phase angle $(\phi_i - \lambda)$ is varied at the frequency of vertical oscillations in the propulsion vehicle the formation of a vertical corrective force oscillating with the same frequency will automatically result. This corrective force can be used to counteract the vertical oscillations of the propulsion vehicle and attenuate them. Thus it is possible this manner to cancel the vertical oscillations by corrective forces supplied by the syndhronous linear motor. At the same time it is possible to vary the magnitude of the stator current I so that the propulsion force componet $F_x$ remains constant. In the the embodiment to be described in more detail below a decoupler is used for this purpose. It enables the propulsion force componet $F_x$ and the normal force component $F_z$ to be controlled independently of each other when the phase angle $(\phi_i - \lambda)$ and the amplitude of the stator current I are varied.

An attenuation control circuit for the attenuation of vertical oscillations requires measuring means which determine the state of oscillation of the motor vehicle normal to the track plane. This information must be available at the stationary converter station located along the track. It is possible to measure the oscillating suspension height of the propulsion vehicle optically and to transmit this information to the converter station using a radio link. Such a link is saved however in the control device shown on FIG. 2 through the use of an indirect-measuring method.

This indirect-measuring method is based on the following analysis. The braking force counteracting the propulsion force component $F_x$ of the synchronous linear motor varies as a function of suspension height. The braking force is small at a large suspension height and great at a low suspension height. The synchronous linear motor must be supplied with active power to overcome the braking force. If the motor vehicle speed is given, the active power variations at the input due to the braking force variations are a function strictly of the suspension height variations. [Assuming no other distrubing forces]. If the natural frequency of the vertical oscillations, i.e. the oscillations of the suspension height is known, the components of a signal representing the active power at the input which results from vertical oscillations of the propulsion vehicle can be separated using a band pass filter tuned to the natural frequency and further processed.

Referring back to FIG. 2, measuring means 11 are shown for the measurement of the vertical oscillations of the propulsion vehicle. These means comprise a current transformer 20 and voltage transformer 21 disposed at the output of the converter 12 in the vicinity of the input 10 of the synchronous linear motor. The output of the current transformer 20 and voltage transformer 21 are inputs to a multiplier 22 which multiplies them to obtain an output proportional to power P. This value value so obtained represents the active power being fed into the synchronous linear motor 2. This signal will comprise a DC component proportional to speed and an AC component proportional to vehicle oscillations and having a frequency in the vicinity of the natural frequency of the vehicle. This output is then provided to a filter 23. The filter 23 preferably will be a band pass filter tuned to the frequency range of vertical oscillations. It may either an actice or passive band pass filter. The output of the filter 23 designated $P_e$ will be a signal reflecting in frequency and amplitude the vertical oscillations of the vehicle. This output $P_e$ is provided to the input of an attenuation control device 24 which includes a summing junction 25 where this signal is summed with a desired signal $P_e^*$ equal to zero i.e: a signal indicating that an oscillation level equal to zero is desired. The output of the summing junction is coupled as the input to a control unit 26. This control device along with other control devices described below can be designed along the lines of the summing integrators described in paragraph II.1 and II.11 of "Application Manual for Operation Amplifiers for Modeling Measuring Manipulating and Much Else" published by Philbrick Nexus Research (1968). Suitable time constance can be selected in a manner well known by those skilled in the art. The output signal s of the control unit 26 is utilized as a supplemental control signal for the control circuit used to control the propulsion of the vehicle at the optimum operating point. The output signal s is superimposed on the control deviation of this control signal. If the supplemental control signal s is zero and all other conditions remain unchanged, the synchronous linear motor operates at its optimum operating point $\phi_i = \lambda$ under control of this control circuit. This is the point illustrated on FIG. 5. In such a case no normal force component $F_z$ is produced. However if the supplemental control signal s is not zero the control circuit for obtaining optimum operation becomes detuned and operates outside the optimum operating point so that a normal force component $F_z$ in a direction to cancel the vertical oscillations occurs. This force $F_z$ thus fluctuates in rhythm and in proportion to the magnitude of the supplemental control signal s to compensate the vertical oscilattions of the vehicle. As is evident from FIG. 5 a deviation from the optimum operating point $\phi_i = \lambda$ results in the normal force component $F_z$ but at the same time also results in a reduction of the maximum propulsion force component $F_x$. In order to compensate for this reduction the supplemental control signal s is at the same time applied to the control circuit in such a manner to bring about an increase in the stator current I. As illustrated on FIG. 5 there is a transition from the solid line to the broken lines of the force component curves $F_x$ and $F_z$.

As illustrated on FIG. 2 the control circuit 2 controlling the synchronous motor so that it operates at the optimum operating point includes a current angle control circuit and a current magnitude control circuit. The current angle control circuit includes a control angle device 27 made up of a summing junction 28 the output of which is coupled into a current angle regulator or control device 29. This control device can also be constructed in accordance with the above reference Philbrick/Nexus Publication. The current magnitude control similarly includes control means 30 having a summing junction 31 and a current magnitude regulator 32. Associated with the overall control circuit which controls the optimum operating point is a decoupler 33 which is quite important to proper operation of the circuit.

The current angle control circuit of FIG. 2 will be discussed first. The current angle summing junction 28 is used for forming the phase angle $\phi_i - \lambda$ i.e. it forms an output which is the difference between the phase angle $\phi_i$ and the phase angle $\lambda$. The phase angle $\lambda$ which determines the phase of the main field voltage $U_h$ as illustrated on FIG. 3 is developed in a pole position transmitter 34. This pole position transmitter 34 may be an computing circuit, as described in the aforementioned patent application Ser. No. 493,895. It computes the phase angle $\lambda$ in accordance with the vector diagram of FIG. 3. To do so a total of seven signals are fed into the computing circuit. First there are two signals for the voltage U at the input 10. The voltage U itself along with a input $r$ representing the reference axis are inputs to a vector analyzer 35 which develops outputs representing the absolute magnitude $|U|$ and the phase angle $\phi_u$ of this voltage U. Similarly, a vector analyzer 36 is used to develop from the current transformer output the magnitude $|I|$, and $\phi_i$ the phase angle which the current vector I makes with the reference vector $r$. In addition signals representing the resistance R, the inductance L and the operating frequency of the synchronous linear motor are also fed into the computing circuit. As more fully described in the aforementioned application the signals R and L may be fixed inputs or, in order to obtain a more accurate computation may be determined by direct measurement in the respective line section. The computing circuit 34 acting as a pole position transmitter computes from these seven input signals the phase angle $\lambda$ of the field voltage $U_h$ which is not directly measurable.

At the optimum operating point the stator current I and the main field voltage $U_h$ must have the same phase. Therefore $\phi_i$ must equal $\lambda$. The phase angle $\phi_i$ which is obtained from the vector analyzer 36 is provided as one input to the summing junction 28. The second input fed to this summing junction is the phase angle $\lambda$ so that its output will represent the deviation between the two. The output of the summing junction 28 is provided to a further summing junction 37. Here the phase angle $(\phi_i - \lambda)$ has added to it a superimposed signal $p$ which is a measure of the desired deviation $(\phi_i - \lambda)$ from the optimum operating point. This signal is obtained from the decoupler 33 in a manner to be described below. The result of this summation or comparison is provided as the input to the current angle regulator 29. The output of the current angle regulator 29 is connected in conventional fashion to the control input of phase shifter 38 having its output coupled to the control unit 14 for the converter so that the pulses formed therein may be properly shifted to create the desired phase relationship at the synchronous linear motor.

The timing of the inverter 17 by means of the control unit 14 must also be done in response to the signal $r$. Thus, the signal $r$ is also fed to the phase shifter 38. What occurs in the phase shifter 38 is that the two signals are used to generate a timing signal T which is at the proper phase position to maintain the optimum operating point $\phi_i = \lambda$.

The current magnitude control circuit will now be discussed. The absolute value I is supplied as an input to the summing junction 31 from the vector analyzer 36. Here it is compared with a value $|I|^*$ and the result of this substraction provided as an input to the current magnitude regulartor 32. The value $|I|^*$ is a desired value developed in the decoupler 33 primarily in response to an input value $F_x^*$ representing the desired force in the propulsion direction. In addition, as will be seen below, it will contain a further component obtained from the input $s$ used to maintain current magnitude constant as phase angle deviates. The control deviation $|I|^* - |I|$ formed in the current magnitude summing junction 31 and current magnitude regulator 32 is developed into a signal $x$ which is provided as an input to the control unit 14.

The reference signal $r$ is developed in a control unit 39. At the input to this control unit is a summing junction 40 having as a reference input $\lambda^* = 0$. The second input to this summing junction 40 is the actual value $\lambda$ developed in the computer 34. This arrangement insures that the vector $r$ of FIG. 3 is coincident in the stationary state with the main field voltage vector $U_h$, i.e. it insures that the phase angle $\lambda$ is equal to zero.

Considering again the attenuation control circuit it should be emphasized that the output signal of the control unit 26 and designated as $s$ can also be considered as the desired value $F_z^*$ for the normal force component $F_z$. The output signal $s$ acts essentially on the superimposed signal $p$ which also depends on the theoretical value $F_x^*$ however. That is to say, the value $p$ is primarily related to the value $s$ and the value $|I|^*$ primarily related to the value $F_x^*$. However each of the two output signals does depend in some degree on the two inputs signals as will more clearly be seen below. The interdependence is based on the following analysis. As illustrated by FIG. 5 the propulsion force component $F_x$ and the normal force component $F_z$ can be expressed as follows:

$$F_x = k_x \ |I| \ \cos(\phi_i - \lambda) \text{ and}$$
$$F_z = k_z \ |I| \ \sin(\phi_i - \lambda),$$

where $k_x$ and $k_z$ are constants. Through elementary transformation the following is obtained:

$$(\phi_i - \lambda) = -\arctan(F_z/F_x) \tag{1}$$

$$|I| = (F_x^2/k_x^2 + F_z^2/k_z^2)^{1/2}. \tag{2}$$

The phase angle $(\phi_i - \lambda)$ in equation 1 is the deviation from the optimum operating points which is both required and desired in order to compensate the oscillations and thus corresponds to the superimposed signal $p$. In order to keep the stator current $|I|$ constant, the relation to above must be fulfilled for each pair of values $F_x$ and $F_z$.

Figure 6:
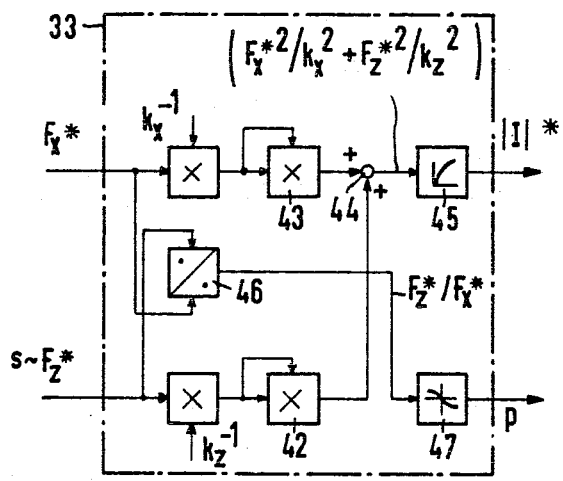
FIG. 6 is a circuit diagram of the decoupler of FIG. 2.

The decoupler 33 of FIG. 2, shown in more detail on FIG. 6, is designed in accordance with these equations. That is it forms the signal $|I|*$ and $p$ from the input signals $F_x*$ and $s \approx F_z*$. The signal $F_x*$ is first multiplied by $k_x^{-1}$. Similarly the signal $F_z*$ is multiplied by $k_z^{-1}$. The respective outputs so obtained are then squared in respective multipliers 43 and 42. The output of multipliers 42 and 43 are summed at a summing junction 44 and then provided as an input to a function generator 45 adapted to generate a square root function. Thus, the output $I*$ represents equation (2) above. Function generator 45 may be constructed along the lines set out in the above mentioned Philbrick/Nexus Research Publication at paragraph II.23. The two input signals $F_x*$ and $F_z*$ are also divided in a divider to get the quantity $F_z*/F_x*$ which is then provided as an input to a function generator 47 adapted to form the arc tangent function in all four quadrants. Again this circuit may be designed along the lines outlined in the above reference publication. The signal $p$ thus represents equation (1) above.

Thus, the signal $p$ which is added to the summing junction 37 to the undesired deviation $(\phi_i - \lambda)$ brings about the cancellation of oscillations with the signal $I*$ keeping the propulsion force component $F_x$ constant. The two control measures are taken separately from each other but at the same time.

The attenuation control circuit of FIG. 2 has another advantageous quantity. It assures that a normal force component $F_z$ sufficient for attenuation is available even when, during certain operating conditions, the force component $F_x$ is too small. If the propulsion force component $F_x$ is small because only a small amount of propulsion is required, the two curves $F_x$ and $F_z$ of FIG. 5 become much flatter than illustrated because of the smaller stator current I. Even in such a case an adequate normal force $F_z$ can be produced, particularly where the phase angle $(\phi_i - \lambda)$ assumes high values such as those close to $\pm 90°$. In such a case the stator current I can be increased without the occurrance of a large propulsion force component $F_x$. This desirable control behavior is achieved by means of the decoupler 33.

Figure 7:
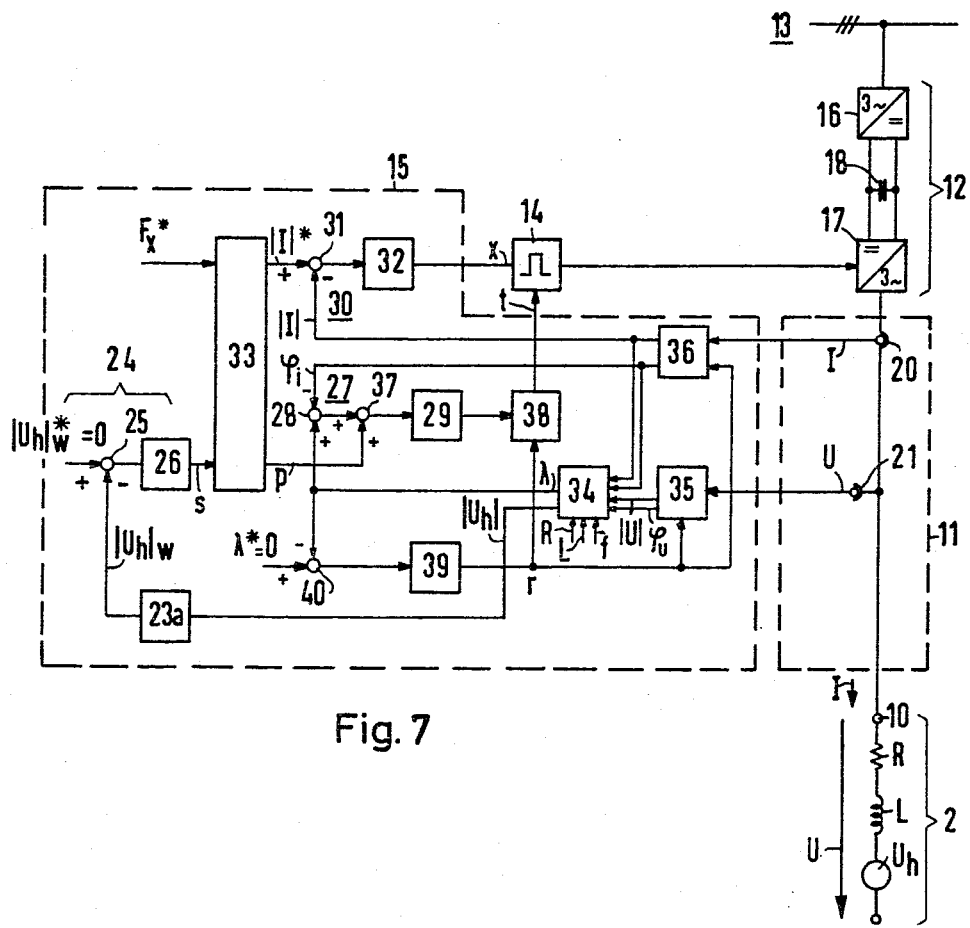
FIG. 7 is a further embodiment of the invention wherein a computing circuit for computation of the main field voltage is utilized.

FIG. 7 illustrates an alternate embodiment corresponding in most part to the embodiment of FIG. 2 but having a different means for measuring vertical oscillations indirectly. Identical portions of the circuit have been given identical reference numerals and operation thereof will not be described again. The indirect measuring method used in the arrangement of FIG. 7 is based on the fact that the magnitude of the main field voltage $U_h$ is a function of the suspension height. If the suspension height is large, the main field voltage $U_h$ is small and, if the suspension height is low, the main field voltage $U_h$ is large. Thus, if the speed of the motor vehicle is given, the state of oscillation of the propulsion vehicle in the direction normal to the plane of the track can be determined from the main field voltage $U_h$. Furthermore the magnitude of the main field voltage is not influenced by extraneous interference factors such as wind gusts, up and down hill travel and travel on curves which affect the active power of the propulsion vehicle. The main field voltage $U_h$ includes a DC component on which is superimposed an additional AC component occurring when vertical oscillations take place. The AC component resulting from the vertical oscillations can easily be separated through a high pass filter and then processed further. As illustrated by FIG. 7, the measuring means 11 comprise only the current and voltage transformers 20 and 21 which are required in any case. A separate means including a multiplier such as the multiplier 22 of FIG. 2 is not required. The absolute value $|U_h|$ of the main field voltage $U_h$ is obtained through calculations in the computing circuit 34 which is present in any case. This circuit, used as a pole position transmitter, carries out the computation in the manner described in the aforementioned copending Patent application. Thus the computing circuit 34 computes not only the phase angle $\lambda$ but also the magnitude $|U_h|$ of the main field voltage $U_h$. The quantities used to carry out this computation are available at the location of the converter 12 and transmission from the vehicle is not necessary. The value $|U_h|$ is provided to the input of the high pass filter 23a which in its simpliest embodiment comprise a capacitor. The signal $|U_h|_w$ obtained at the output of the filter 23a changes at the frequency of the vertical oscillations of the propulsion vehicle and has an amplitude proportional to the amplitude of oscillation. The DC voltage component is separated and not further processed. The signal so obtained is one input to the summing junction 25 in an attentuation control device 24. At the summing junction is compared with or subtracted from a desired value $|U_h|*_w$ equal to zero with the difference provided as an input up to the control unit 26 which then develops the output signal $s$ in the manner described above. The output signal $s$ is then used, after passing through the decoupler 33, as a value which is superimposed on the control circuit which maintains operation at the optimum operating point. The remainder of the circuit is exactly as that described above in connection with FIG. 2.

Thus, an improved method of attenuating vertical oscillations in a suspended propulsion vehicle driven by a synchronous linear motor has been shown. Although specific embodiments have been illustrated and described, it will be obvious to those skilled in the art that varios modifications may be made without departing from the spirit of the invention which is intended to be limited solely by the appended claims.

What is claimed is:

1. In a track-bound propulsion vehicle system having means for suspending the vehicle above a track and driven by a synchronous linear motor having a stator installed along the track in the form of a traveling field winding and an exciter disposed on the motor vehicle as a translator moving therewith, improved means for attenuating vertical oscillations in the propulsion vehicle comprising:
   a. means for supplying the travelling field winding of the synchronous linear motor with an AC voltage which can be varied in amplitude and phase;
   b. means for controlling the operation of said means supplying said voltage;
   c. means for measuring vertical oscillations in the vehicle and providing an output signal proportional thereto;
   d. means having said output signal as an input for developing an attenuation control signal; and
   e. means coupling said attenuation control signal to said means for controlling.

2. Apparatus according to claim 1 and further including a filter between said measuring means and said control device means for developing.

3. Apparatus according to claim 2 wherein said filter is a bandpass filter tuned to the frequency range of said vertical oscillations.

4. Apparatus according to claim 3 wherein said bandpass filter comprises a capacitor and two resistors in series with a shunt capacitor coupled to the junction point of said two resistors.

5. Apparatus according to claim 3 wherein said bandpass filter comprises an operational amplifier having high open circuit gain with a capacitor and resistor in series in its input circuit and a resistor and capacitor in parallel in its feedback path.

6. Apparatus according to claim 2 wherein said filter is a high pass filter.

7. Apparatus according to claim 1 wherein said measuring means is an acceleration measuring means for measuring the vertical oscillation acceleration of said vehicle, said acceleration measuring means being rigidly coupled to said vehicle.

8. Apparatus according to claim 1 wherein said measuring means is a distance measuring means rigidly coupled to the vehicle.

9. Apparatus according to claim 1 wherein said measuring means is an electrical power measuring means located at the input of the traveling field winding.

10. Apparatus according to claim 9 wherein said electric power measuring means comprises:
   a. a current transformer;
   b. a voltage transformer; and
   c. a multiplier having as inputs the outputs of said current transformer and voltage transformer.

11. Apparatus according to claim 1 wherein a control circuit for controlling the propulsion vehicle to an optimum operating point is provided and wherein said attenuation control signal is superimposed on the control deviation in the optimum operating point control circuit.

12. Apparatus according to claim 11 wherein said optimum operating point control circuit comprises:
   a. a current angle control circuit, said attenuation control signal being superimposed on the current angle deviation developed in said current angle control circuit so as to detune said control circuit from the optimum operating point; and
   b. a current magnitude control circuit.

13. Apparatus according to claim 12 wherein said attenuation control signal is further superimposed on a desired current value developed in said current magnitude control circuit such as to keep the current magnitude constant.

14. A circuit according to claim 13 wherein the desired current value for use in the current magnitude control circuit is developed from a desired propulsion force component signal in apparatus comprising:
   a. a first multiplier having the desired propulsion force value as an input;
   b. a second multiplier having as an input said attenuation control signal, said first and second multipliers multiplying their respective inputs by a constant;
   c. first means for squaring the output of said first multiplier;
   d. second means for squaring the output of said second multiplier;
   e. means for summing the outputs of said first and second squaring means; and
   f. means having as an input the output of said summing means for taking the square root of said input and providing its output as the desired current value.

15. Apparatus according to claim 12 wherein a circuit is provided for developing a signal made up of said attenuation control signal influenced by a desired value for the propulsion force, said developed signal being the signal superimposed in said current angle control circuit said apparatus comprising:
   a. a divider having as a dividend input said attenuation control signal and as a divisor input a signal proportional to said desired value for the propulsion force; and
   b. means coupled to the output of said dividing means for taking the arc tangent thereof to provide an output signal which is the signal superimposed in said current angle control circuit.

16. Apparatus according to claim 14 wherein a circuit is provided for developing a signal made up of said attenuation control signal influenced by a desired value for the propulsion force, said developed signal being the signal superimposed in said current angle control circuit said apparatus comprising:
   a. a divider having as a dividend input said attenuation control signal and as a divisor input a signal proportional to said desired value for the propulsion force; and
   b. means coupled to the output of said dividing means for taking the arc tangent thereof to provide an output signal which is the signal superimposed in said current angle control circuit.

17. A circuit according to claim 1 wherein said measuring means comprises a computing circuit adapted to compute the magnitude of the main field voltage as the quantity dependent on vertical oscillations.

18. Apparatus according to claim 16 wherein a control circuit for controlling the propulsion of the vehicle to an optimum operating point is provided and wherein said attenuation control signal is superimposed on the control deviations in said optimum operating point control circuit and wherein said computing circuit is a common computing circuit also providing an output proportional to the actual value of the angle between the main field voltage and a reference axis, said actual value being used in the operation of said optimum operating point control circuit.

19. A circuit according to claim 18 wherein a high pass filter is inserted between the output of said computing circuit and said damping control device.

* * * * *